United States Patent
Ono

(10) Patent No.: US 7,433,704 B2
(45) Date of Patent: Oct. 7, 2008

(54) PORTABLE COMMUNICATION TERMINAL

(75) Inventor: Hiroshi Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 600 days.

(21) Appl. No.: 11/058,273

(22) Filed: Feb. 16, 2005

(65) Prior Publication Data

US 2005/0181820 A1    Aug. 18, 2005

(30) Foreign Application Priority Data

Feb. 17, 2004    (JP)    ............................. 2004-039977

(51) Int. Cl.
H03H 9/00    (2006.01)
(52) U.S. Cl. ................. 455/550.1; 455/563; 455/569.1; 379/93.37
(58) Field of Classification Search ............... 455/550.1
See application file for complete search history.

(56) References Cited

U.S. PATENT DOCUMENTS

| | | | | |
|---|---|---|---|---|
| 4,792,986 | A * | 12/1988 | Garner et al. | 455/90.2 |
| 5,224,151 | A * | 6/1993 | Bowen et al. | 455/569.1 |
| 5,673,325 | A * | 9/1997 | Andrea et al. | 381/92 |
| 6,134,456 | A * | 10/2000 | Chen | 455/569.2 |
| 6,223,161 | B1 * | 4/2001 | Schliwa | 704/275 |
| 6,349,225 | B1 * | 2/2002 | Lands et al. | 455/575.3 |
| 6,360,203 | B1 * | 3/2002 | Prince | 704/270 |
| 6,381,312 | B1 * | 4/2002 | Hayashi | 379/93.37 |
| 6,381,447 | B1 * | 4/2002 | Eguchi | 455/90.1 |
| 6,549,630 | B1 | 4/2003 | Bobisuthi | |
| 6,750,765 | B1 * | 6/2004 | van Wijk | 340/505 |
| 6,751,446 | B1 * | 6/2004 | Kim et al. | 455/90.1 |
| 6,774,578 | B2 * | 8/2004 | Tanada | 315/169.4 |
| 6,799,031 | B1 * | 9/2004 | Lewiner et al. | 455/404.1 |
| 6,819,939 | B2 * | 11/2004 | Masamura | 455/550.1 |
| 6,882,335 | B2 * | 4/2005 | Saarinen | 345/156 |
| 6,903,516 | B2 * | 6/2005 | Tanada | 315/169.4 |
| 6,990,334 | B1 * | 1/2006 | Ito | 455/414.3 |
| 7,031,474 | B1 * | 4/2006 | Yuen et al. | 381/1 |
| 7,058,430 | B2 * | 6/2006 | Aubauer et al. | 455/569.1 |
| 7,092,745 | B1 * | 8/2006 | D'Souza | 455/575.1 |
| 7,103,393 | B2 * | 9/2006 | Hwang | 455/569.1 |
| 7,200,411 | B2 * | 4/2007 | Watanabe et al. | 455/456.4 |
| 7,260,231 | B1 * | 8/2007 | Wedge | 381/310 |
| 7,359,740 | B2 * | 4/2008 | Okuzako et al. | 455/575.3 |

(Continued)

FOREIGN PATENT DOCUMENTS

CN    1279570    1/2001

(Continued)

Primary Examiner—Matthew Anderson
Assistant Examiner—Hai V Nguyen
(74) Attorney, Agent, or Firm—Young & Thompson

(57) ABSTRACT

Acoustic input and output devices are made to operate properly according to communication processing. A portable communication terminal includes an acoustic input-output unit including a plurality of acoustic input elements to conduct acoustic inputting and acoustic output elements to conduct acoustic outputting, a communication . processing unit which selectively executes mutually different communication processes using at least one of the elements included in the acoustic input-output unit, and an acoustic processing unit which determines an order of operation of the acoustic input-output unit to be conducted by the elements according to a communication process executed by the communication processing unit and gives the determined operation order to the acoustic input-output unit.

20 Claims, 12 Drawing Sheets

U.S. PATENT DOCUMENTS

| | | |
|---|---|---|
| 2002/0137478 A1 | 9/2002 | Masamura |
| 2002/0146136 A1* | 10/2002 | Carter, Jr. .................... 381/59 |
| 2003/0114206 A1* | 6/2003 | Timothy et al. ............. 455/575 |
| 2003/0157969 A1* | 8/2003 | Kim ........................... 455/563 |
| 2004/0203996 A1* | 10/2004 | Hansson ................. 455/550.1 |
| 2004/0225504 A1* | 11/2004 | Junqua et al. ............... 704/275 |
| 2005/0026568 A1* | 2/2005 | Hawker et al. ................ 455/70 |
| 2005/0179640 A1* | 8/2005 | Tanaka et al. .............. 345/103 |
| 2005/0239521 A1* | 10/2005 | Harada et al. ........... 455/575.3 |
| 2005/0240318 A1* | 10/2005 | Naoi et al. ..................... 701/1 |
| 2006/0058036 A1* | 3/2006 | Watanabe et al. ........ 455/456.1 |
| 2006/0100879 A1* | 5/2006 | Jakobsen et al. ............ 704/270 |

FOREIGN PATENT DOCUMENTS

| | | |
|---|---|---|
| EP | 0 776 115 | 5/1997 |
| EP | 0 897 236 | 2/1999 |
| EP | 1 091 539 | 4/2001 |
| EP | 1 124 175 | 8/2001 |
| EP | 1 353 489 | 10/2003 |
| EP | 1 383 298 | 1/2004 |
| GB | 2 336 973 | 11/1999 |
| GB | 2 372 666 | 8/2002 |
| GB | 2 373 408 | 9/2002 |
| JP | 57-210752 | 12/1982 |
| JP | 01-268242 | 10/1989 |
| JP | 5-91583 | 4/1993 |
| JP | 11-289290 | 10/1999 |
| JP | 2002-111817 | 4/2002 |
| JP | 2002-118642 | 4/2002 |
| JP | 2002-209133 | 7/2002 |
| JP | 2002-257120 | 9/2002 |
| JP | 2002-281135 | 9/2002 |
| JP | 2004-32444 | 1/2004 |

* cited by examiner

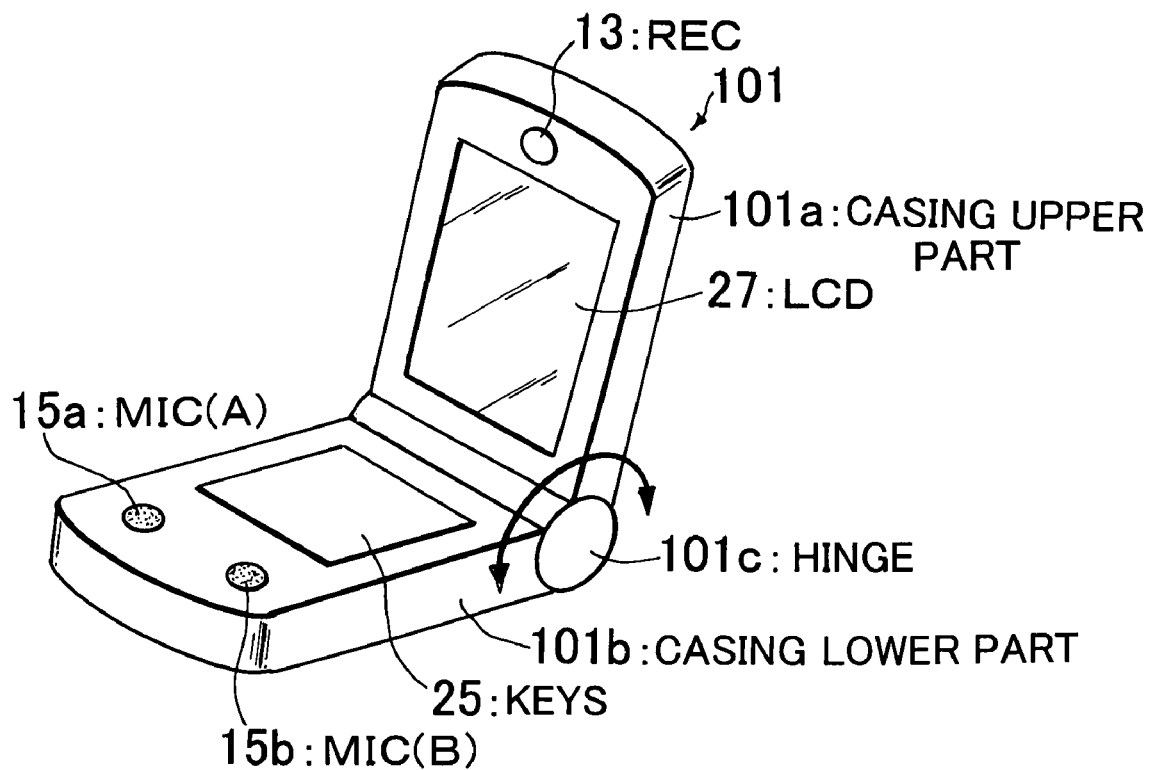
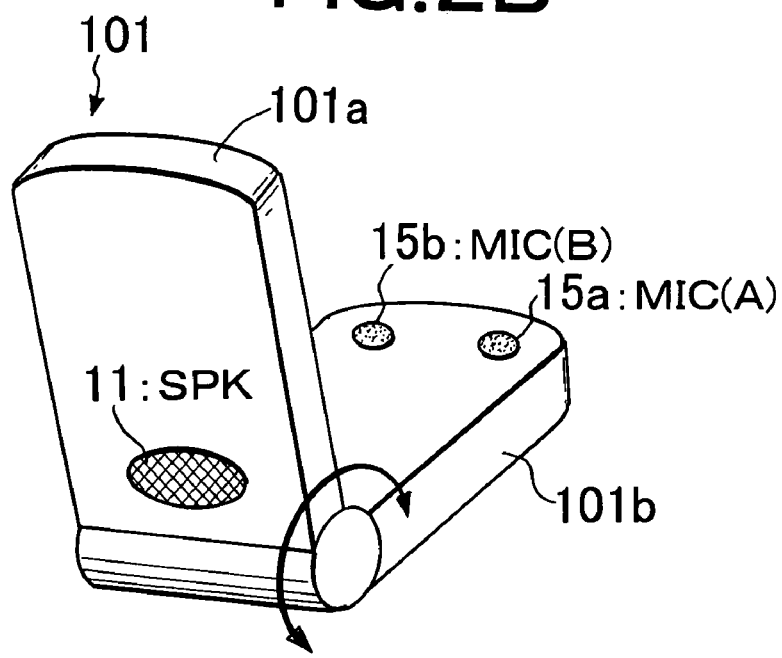

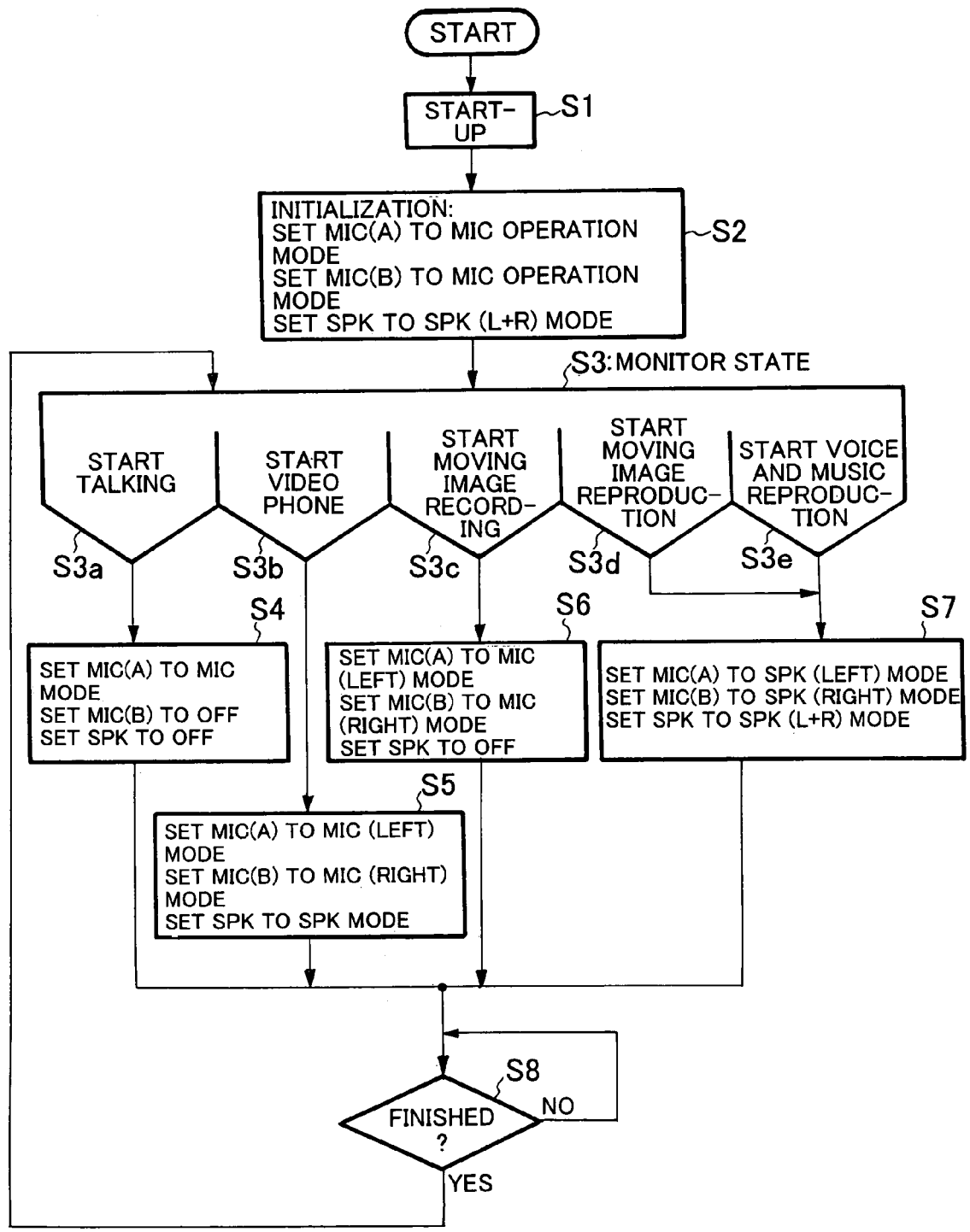

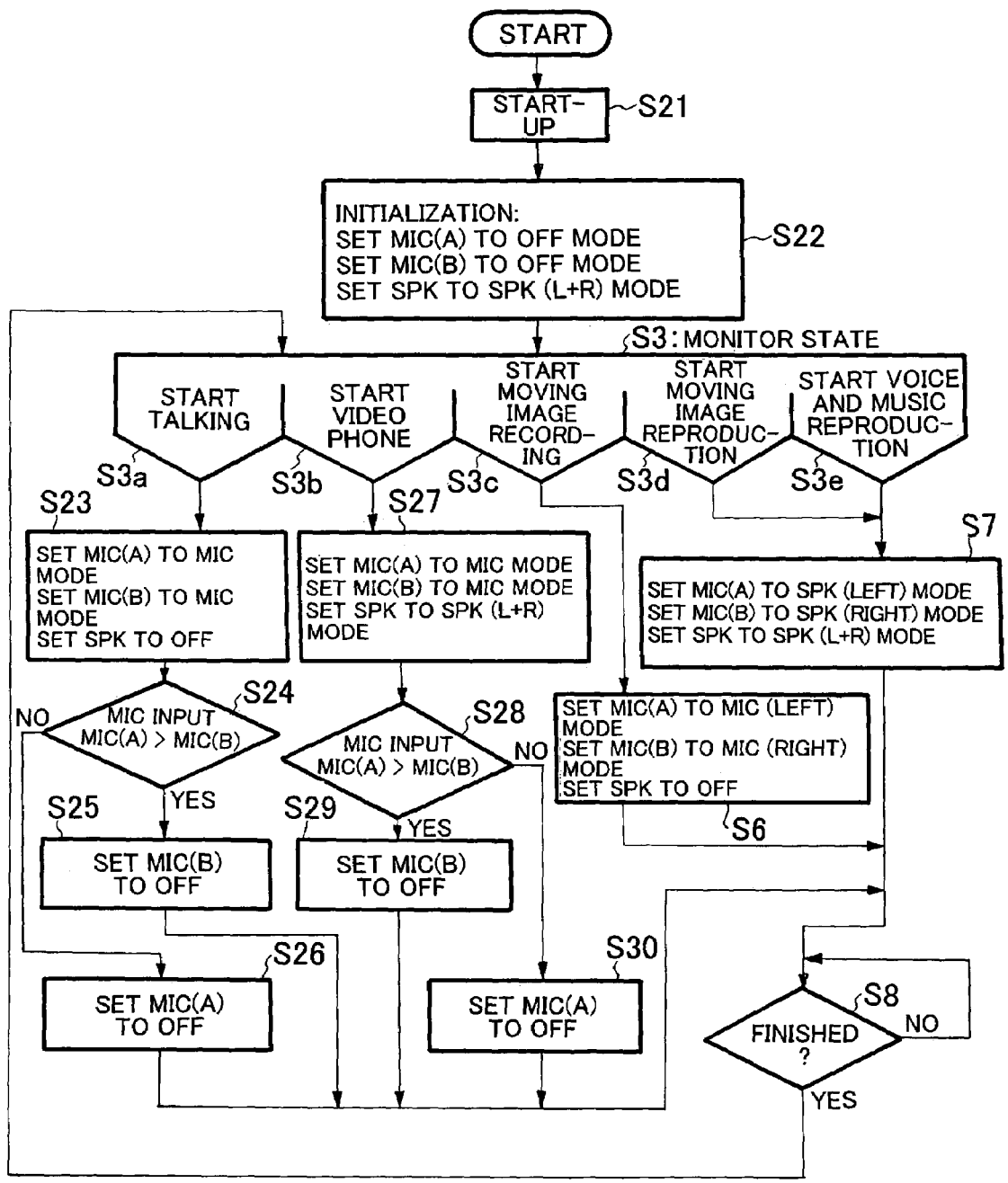

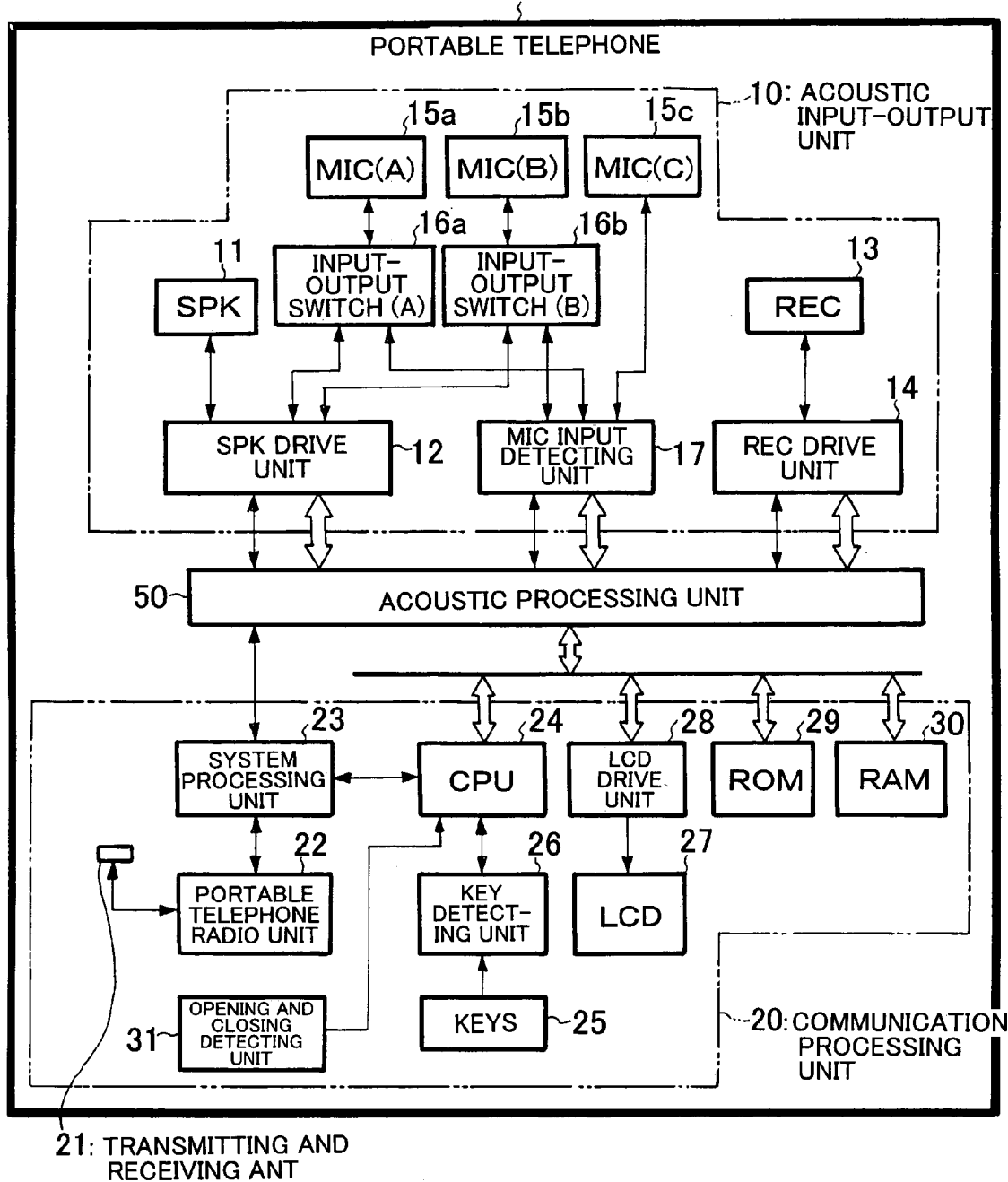

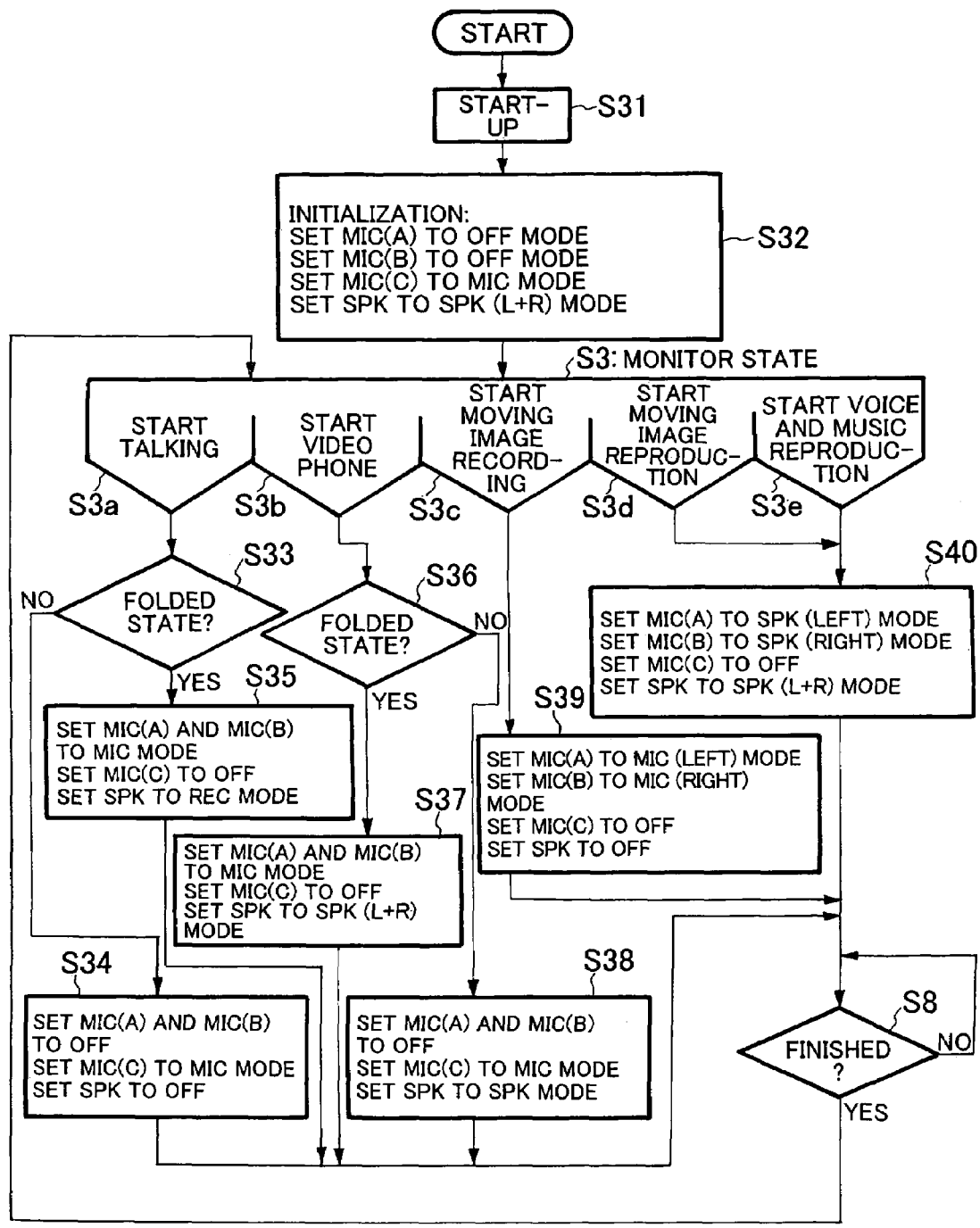

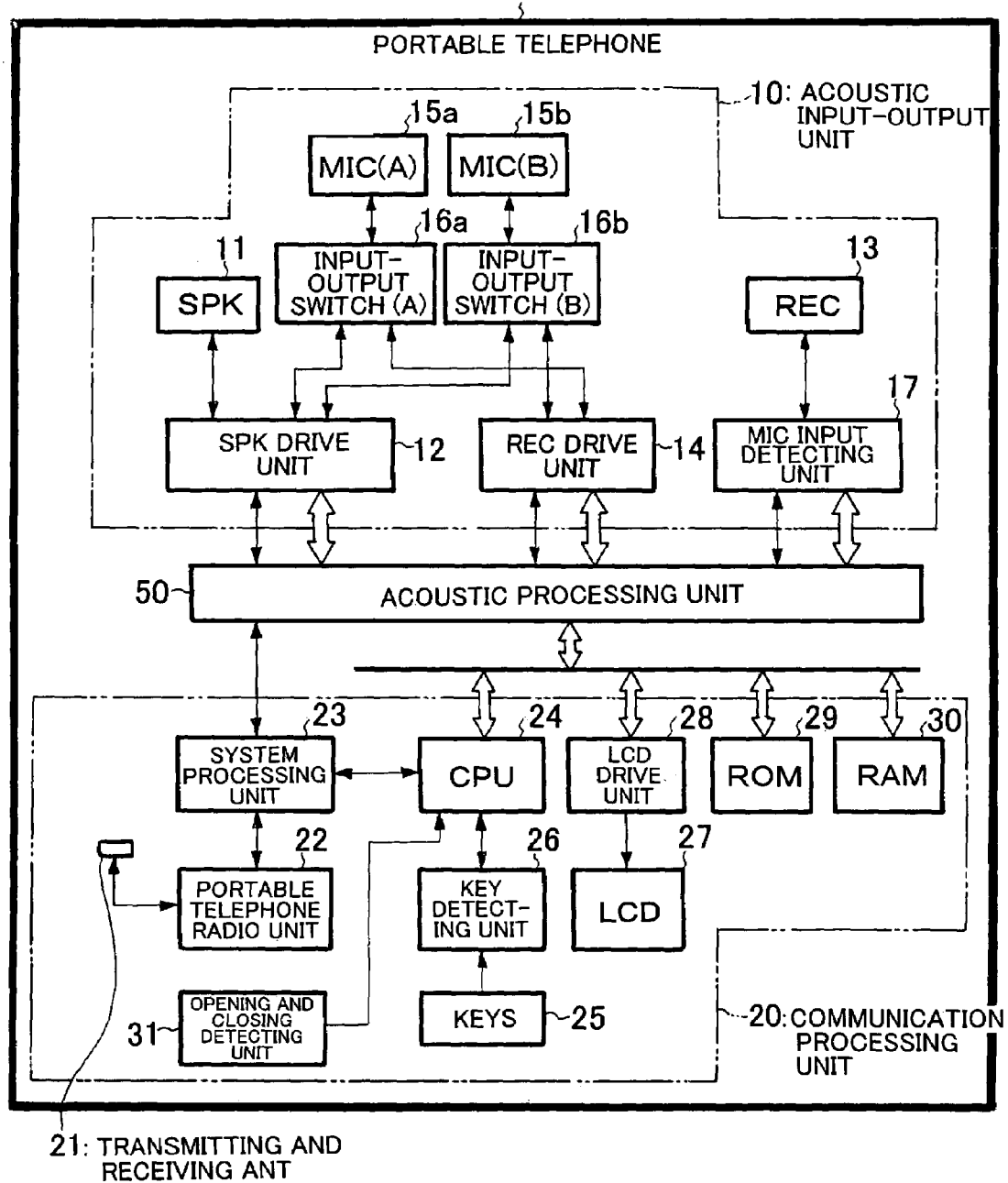

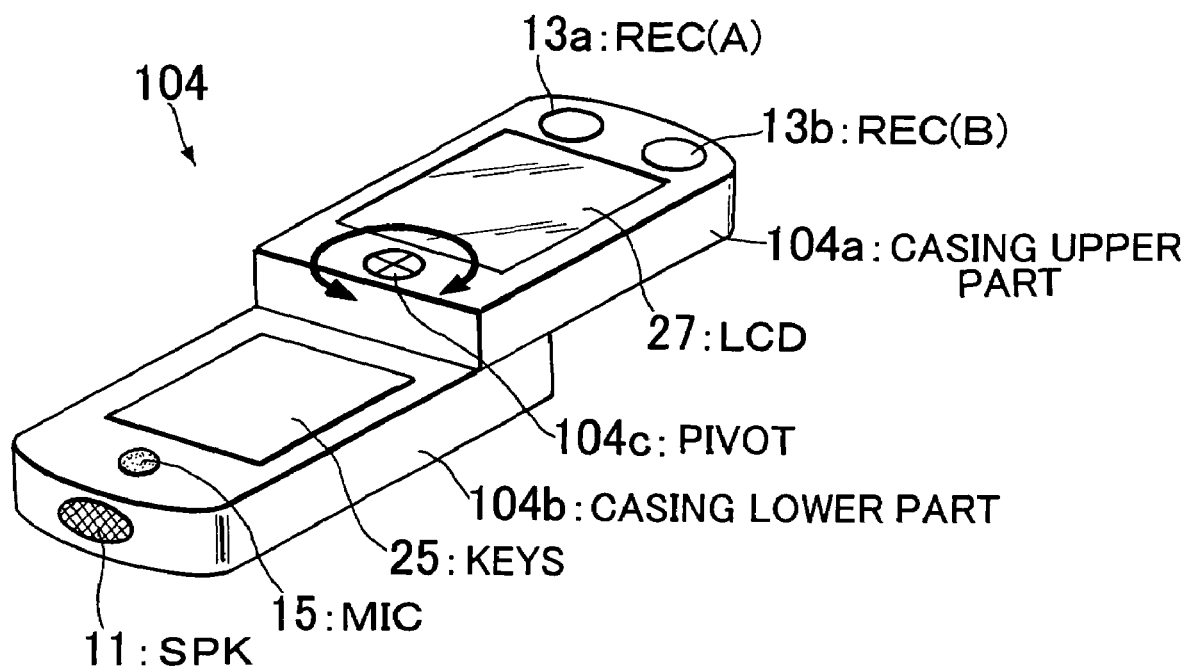

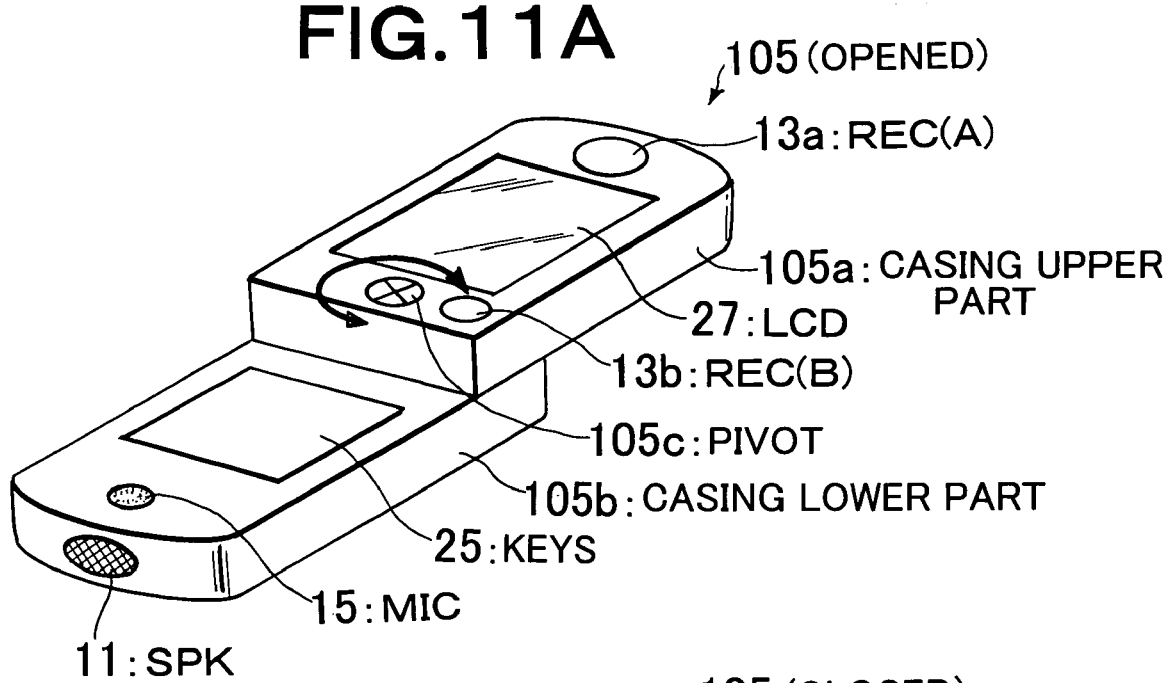
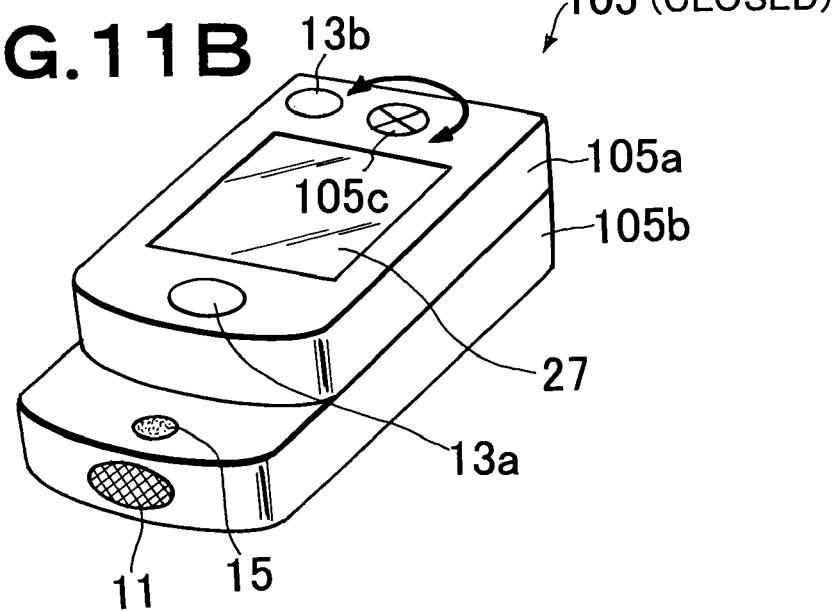

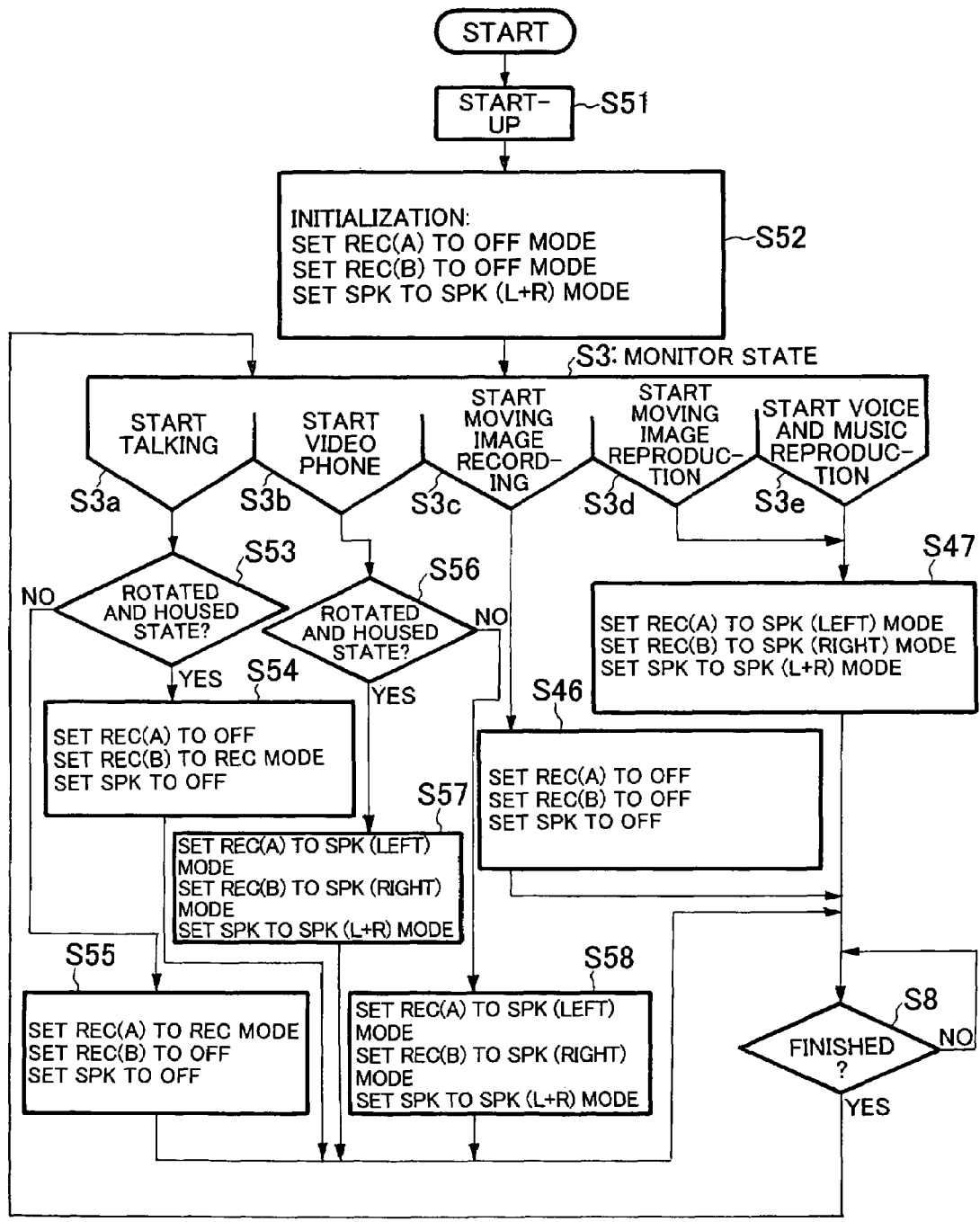

PORTABLE COMMUNICATION TERMINAL

BACKGROUND OF THE INVENTION

The present invention relates to a portable communication terminal such as a portable telephone or a schedule management terminal. In particular, the present invention relates to a portable communication terminal having a plurality of acoustic input-output devices.

There is a conventional technique of attempting to increase the output sound quality by providing a plurality of speakers in a portable communication terminal. As a technique of this kind, for example, there is a technique described in Japanese Patent Application Laid-Open Publication No. 2002-111817. According to this technique, at least two speakers are provided in a portable terminal, and these speakers are made to operate simultaneously so that sounds reproduced by the speakers assist each other.

In recent portable telephones, portable telephones having a plurality of communication functions, such as dynamic image recording, reproducing, transmitting and receiving functions, or the so-called TV telephone function which makes it possible to talk while reproducing a dynamic image, besides a typical talking function are spread. When using such a portable telephone, the use form of the user differs according to the communication function. For example, the terminal is brought into contact with an ear at the time of ordinary talk, whereas the user faces the terminal at the time of use of video phone.

At the time of ordinary talk when the terminal is held to an ear, however, a smaller acoustic output can cope with it as compared with the time of use of video phone. When using the above-described conventional technique in which all of a plurality of speakers are brought into operation, therefore, there is rather a fear that wasteful power will be dissipated. Furthermore, when using video phone and when recording a dynamic image, it is desired to catch more sounds in order to conduct clear acoustic reproduction.

SUMMARY OF THE INVENTION

The present invention has been achieved to solve the problems. An object of the present invention is to provide portable communication terminals capable of smoothly executing acoustic processing respectively suitable for various communication functions.

A portable communication terminal according to the present invention includes an acoustic input-output unit including a plurality of acoustic input means to conduct acoustic inputting and acoustic output means to conduct acoustic outputting, a communication processing unit which selectively executes mutually different communication processes using at least one of the means included in the acoustic input-output unit, and an acoustic processing unit which determines an order of operation of the acoustic input-output unit to be conducted by the means according to a communication process executed by the communication processing unit and gives the determined operation order to the acoustic input-output unit.

Another portable communication terminal according to the present invention includes an acoustic input-output unit including acoustic input means to conduct acoustic inputting and a plurality of acoustic output means to conduct acoustic outputting, a communication processing unit which selectively executes mutually different communication processes using at least one of the means included in the acoustic input-output unit, and an acoustic processing unit which determines an order of operation of the acoustic input-output unit to be conducted by the means according to a communication process executed by the communication processing unit, and gives the determined operation order to the acoustic input-output unit.

According to the portable communication terminal according to the present invention, the acoustic input and output devices are controlled in operation based on communication processing executed in the terminal. Therefore, an acoustic system suitable for the communication processing can be provided.

BRIEF DESCRIPTION OF THE DRAWINGS

FIGS. 2A and 2B are exterior views of a portable telephone in first and second embodiments;

FIG. 3 is a flow chart showing an operation procedure in a first embodiment;

FIG. 4 is a flow chart showing an operation procedure in a second embodiment;

FIG. 5 is a block diagram showing a configuration of a portable telephone in a third embodiment according to the present invention;

FIG. 7 is a flow chart showing an operation procedure in a third embodiment;

FIG. 8 is a block diagram showing a configuration of a portable telephone in fourth and fifth embodiments according to the present invention;

FIG. 9 is an exterior view of a portable telephone in a fourth embodiment;

FIGS. 11A and 11B are exterior views of a portable telephone in a fifth embodiment; and FIG. 12 is a flow chart showing an operation procedure in a fifth embodiment.

DESCRIPTION OF THE PREFERRED EMBODIMENTS

First Embodiment

Figure 1:
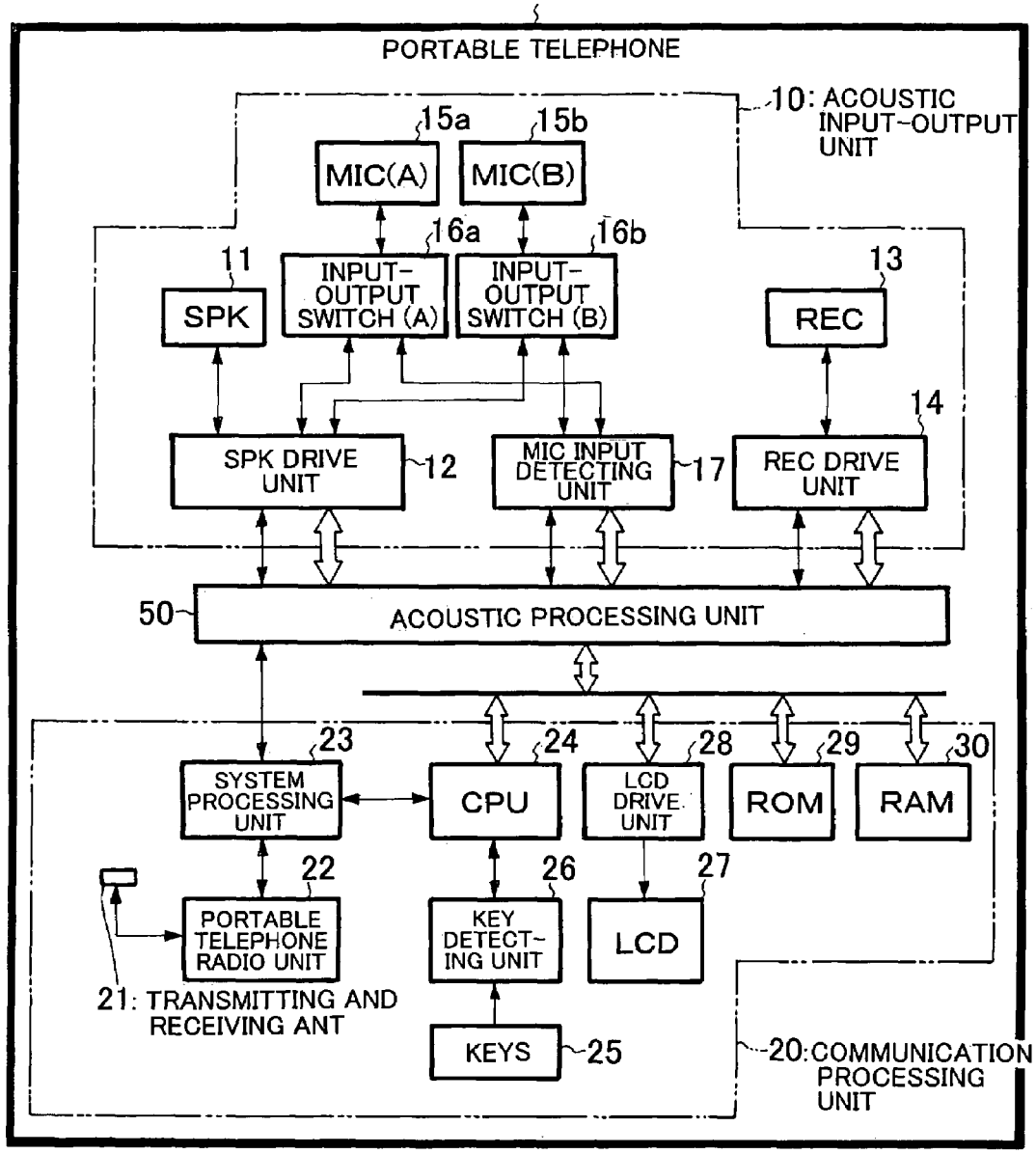
FIG. 1 is a block diagram showing a configuration of a portable telephone in first and second embodiments according to the present invention.

Hereafter, an embodiment of the present invention will be described in detail with reference to the drawings. FIG. 1 is a block diagram showing a configuration of an embodiment of a portable communication terminal according to the present invention. As shown in FIG. 1, a portable telephone 101 which is a portable communication terminal in the embodiment includes an acoustic input-output unit 10 having a plurality of acoustic input means and a plurality of acoustic output means, a communication processing unit 20 which selectively executes communication processing such as ordinary talking using only voice, talking using video phone, dynamic image recording and reproduction, and voice-music reproduction, and an acoustic processing unit 50 which gives an operation order to the acoustic input-output unit 10 according to communication processing in the communication processing unit 20.

The acoustic input-output unit 10 includes an SPK 11, which is a speaker, and a SPK drive unit 12 serving as acoustic output means, a REC 13, which is a receiver fulfilling a talking receiver function, and a REC drive unit 14 serving as the acoustic output means in the same way, microphones MIC15*a* and MIC15*b* each serving as acoustic input means, input-output switches 16*a* and 16*b* which conduct input-output switching described later on the MIC15*a* and MIC15*b*, and an MIC input detecting unit 17 which detects sounds input via the MIC 15*a* and MIC 15*b*.

The communication processing unit 20 includes a transmitting and receiving ANT (antenna) 21 which transmits and receives a radio signal of the portable telephone 101, a portable telephone radio unit 22 which conducts modulation and demodulation of a radio signal, a system processing unit 23 which conducts portable telephone signal processing, a CPU 24, keys 25 serving as an operation input unit, a key detecting unit 26 which detects input conducted by using the keys 25, an LCD 27 and an LCD driving unit 28 which fulfill a display function, a ROM 29 which stores a program, and a RAM 30 which stores data.

The MIC 15*a* and MIC 15*b* in the present embodiment fulfill the function of serving as the acoustic output means such as the SPK 11, besides the function of serving as the acoustic input means. Specifically, the MIC 15A and MIC 15B are made to operate as microphones or speakers according to the communication processing such as talking or image recording. This control is implemented by the acoustic processing unit 50 giving an operation order to the SPK drive unit 12 and the MICA input detecting unit 17, and the input-output switches 16*a* and 16*b* conducting acoustic signal connection switching. By thus making the MIC 15*a* and the MIC 15*b*, which originally serve as the acoustic input means, function as the acoustic output means as well, additional disposition of speaker devices becomes unnecessary and effective use of the design space in the portable telephone 101 becomes possible.

As each of devices which can fulfill the acoustic input and output functions like the above-described MICs 15*a* and 15*b*, for example, a dynamic microphone which is a kind of microphone can be used. As conventionally known, the dynamic microphone has a coil connected to an acoustic plate disposed in a magnetic field of a magnet. Vibration of the acoustic plate is transmitted to the coil to vary the magnetic field. As a result, a current of the input signal flows through the coil.

On the other hand, in conventional speakers, there is a speaker having a configuration similar to that of the above-described dynamic microphone. In the case of this speaker, the acoustic plate connected to the coil is vibrated by a magnetic field generated by the current flowing through the coil, and a sound is output to the outside. By controlling an operation order given to the dynamic microphone, therefore, this microphone implements selective acoustic input and output. By the way, it is generally known that such a technique is applied to, for example, a speaker microphone of a radio machine. In the present embodiment, this technique is used in the MIC 15*a* and MIC 15*b* in the portable telephone 101.

FIGS. 2A and 2B schematically show exterior views of the portable telephone 101 in the embodiment. As shown in FIG. 2A, the portable telephone 101 is a folding telephone in which a casing upper part 101*a* including the REC 13 and the LCD 27 is connected to a casing lower part 101*b* including keys 25 by a hinge mechanism 101*c*. The MIC 15*a* and MIC 15*b* described above are provided on the casing lower part 101*b*. As shown in FIG. 2B, the SPK 11 is provided on a surface of the casing upper part 101*a*, i.e., a surface facing in opposite directions a face of the LCD 27.

An operation procedure of the portable telephone 101 in the embodiment will now be described with reference to a flow chart shown in FIG. 3. When the portable telephone 101 is started (step S1), the acoustic processing unit 50 sets the MICs 16*a* and 15*b* to a microphone operation mode and the SPK 11 to a monaural speaker (left+right) operation mode in the SPK drive unit 12, the MIC input detecting unit 17, and the input-output switches 16*a* and 16*b* as initialization processing for the acoustic input-output unit 10 (step S2). Although not illustrated in FIG. 3, the REC 13 is in a receiver operation mode.

When the MICs 15*a* and 15*b* are operated in the microphone operation mode, operation parameters for conducting acoustic inputting are set in them. At the time of operation in the receiver operation mode, operation parameters for conducting voice output with a volume suitable for receiving operation, in which the user brings the REC 13 into contact with an ear, are set. At the time of operation in a speaker operation mode, parameters for outputting voice with a volume suitable for the user facing the portable telephone 101 as in video phones are set. In this speaker operation mode, a greater clearer voice output as compared with the above-described receiver operation mode is demanded. Accordingly, a greater output gain is set, and a low frequency band in frequency characteristics is set to become high.

When the above-described initialization processing is completed, the CPU 24 in the communication processing unit 20 monitors the operation state of the portable telephone 101. According to the state, the CPU 24 specifies an operation mode of the acoustic input-output unit 10 to the acoustic processing unit 50 (step S3).

For example, when the user starts typical talking, i.e., talking using only voice by using the portable telephone 101 (step S3*a*), the CPU 24 orders the acoustic processing unit 50 to bring one of the MIC 15*a* and the MIC 15*b* operate into the microphone operation mode and bring the other of the microphones and the SPK 11 into an OFF mode, i.e., stop their operation (step S4). At the time of ordinary talking, the MICs 15*a* and 15*b* are close to the mouth of the user so as to capture an uttered sound easily, and consequently one of the microphones is brought into operation whereas the other is stopped. As a result, power consumption can be suppressed.

When starting talking on video phone (step S3*b*), the MIC 15*a* is made to operate in a stereo (left) microphone operation mode and the MIC 15*b* is made to operate in a stereo (right) microphone operation mode, whereas the SPK 11 is made to operate in the speaker operation mode (step S5). At this time, operation parameters for stereo acoustic input are set with respect to the MICs 15*a* and 15*b*. As a result, it becomes possible for the portable telephone 101 to capture more voices by using the MICs 15*a* and 15*b* and capture voice data providing feeling of presence.

When recording a moving image is started (step S3*c*), the MIC 15*a* is set to the stereo (left) microphone operation mode and the MIC 15*b* is set to the stereo (right) microphone operation mode. Thereby, stereo acoustic inputting similar to that described above is conducted. Since the external acoustic outputting is unnecessary at the time of image recording, the SPK 11 is set to the OFF mode (step S6).

When reproducing a moving image or reproducing already recorded voice and delivered music (steps S3*d* and S3*e*), the MIC 15*a* is set to the stereo (left) speaker operation mode and the MIC 15*b* is set to the stereo (right) speaker operation mode whereas the SPK 11 is set to the monaural (left+right) speaker operation mode (step S7). According to the setting, the MICs 15*a* and 15*b* operate as means that outputs the sound to the outside together with the SPK 11 instead of operating as the original acoustic input means.

Operation switching of the MICs 15*a* and 15*b* is executed by switching the connection of the MICs 15*a* and 15*b* from the MIC input detecting unit 17 to the SPK drive unit 12 with the input-output switches 16*a* and 16*b* as described above.

According to the above-described setting, stereo acoustic outputting using the MICs 15a and 15b is executed besides the acoustic outputting using the SPK 11. As a result, voice and music can be provided for the user with feeling of presence. The so-called multi-speaker system can be constructed by thus utilizing the MICs 15a and 15b.

Each time any communication processing described above is finished (yes at step S8), the CPU 24 returns to the step S3 in order to monitor the state again.

Second Embodiment

In the first embodiment described above, any one of the MICs 15a and 15b is set to the OFF mode (step S4) at the time of ordinary talking (step S3a). Alternatively, the microphone to be set to the OFF mode may be determined on the basis of a predetermined condition. Its procedure will now be described with reference to a flow chart shown in FIG. 4. In FIG. 4, steps denoted by the same symbols as those in FIG. 3 according to the first embodiment are like those in the first embodiment, and description of them will be omitted here.

As the initialization processing at the time of start-up (step S21), the portable telephone 101 brings the MICs 15a and 15b into the OFF mode as shown in FIG. 4 (step S22). Then, the MICs 15a and 15b is set to the microphone operation mode at the time of ordinary talking (step S3a).

When talking is started (step S3a), the acoustic processing unit 50 compares input levels of the MICs 15a and 15b detected by the MIC input detecting unit 17 with each other. If the input level of the MIC 15a is higher than that of the MIC 15b (yes at step S24), the MIC 15b is set to the OFF mode to stop its operation and the MIC 15a is made to operate in the microphone operation mode (step S25). If the input level of the MIC 15a is lower than that of the MIC 15b (no at the step S24), the MIC 15a is set to the OFF mode and the MIC 15b is made to operate in the microphone operation mode (step S26). At the time of video phone (step S3b) as well, one of the microphones can be adapted to be stopped in the same way as the above-described procedure (steps S27 to S30).

According to the procedure in the second embodiment, the power dissipation of the portable telephone 101 can be suppressed and a microphone that implements a more favorable voice input can be automatically selected.

Third Embodiment

FIG. 5 is a block diagram showing a configuration of a portable telephone 103 in a third embodiment. The portable telephone 103 is a folding terminal in the same way as the portable telephone 101 described with reference to FIG. 1. Besides the configuration of the portable telephone 101, the portable telephone 103 includes a MIC 15c which is a microphone serving as the acoustic input means, and an opening and closing detecting unit 31 which detects the open/close state of the casing. As the opening and closing detecting unit 31, for example, a pressure sensor provided on the inside of folding near a hinge mechanism in a typical folding portable telephone can be used.

Figure 6A:
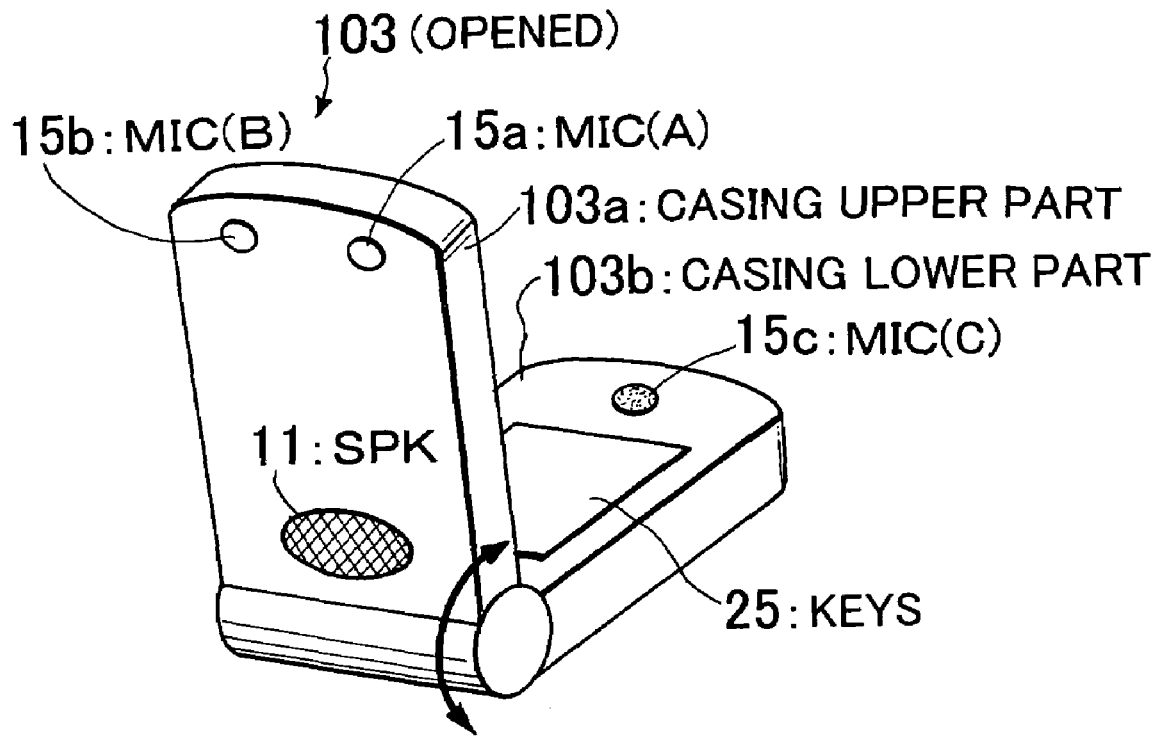
FIGS. 6A and 6B are exterior views of a portable telephone in a third embodiment.
Figure 6B:
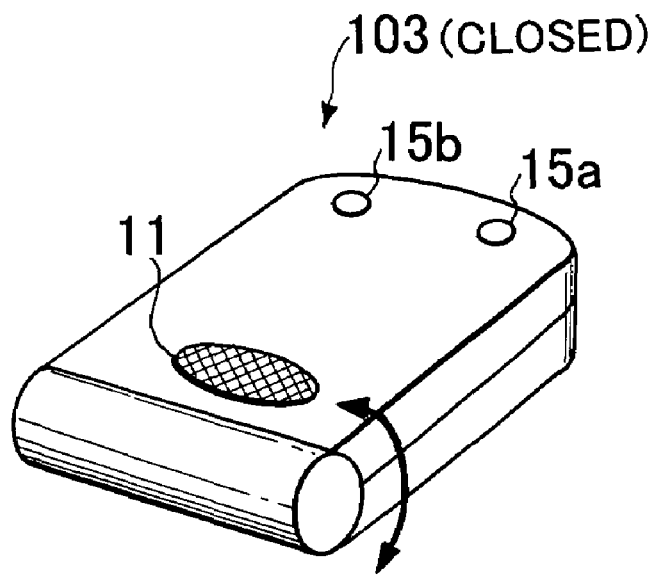

FIGS. 6A and 6B schematically show exterior views of the portable telephone 103. As shown in FIG. 6A, the portable telephone 103 includes the MIC 15a, MIC 15b and SPK 11 on a surface of a casing upper part 103a, and a MIC 15c on a face of a casing lower part 103b coplanar with the keys 25. FIG. 6B shows the state in which the casing of the portable telephone 103 is closed, i.e., the casing upper part 103a is laid on the face of the keys 25 in the casing upper part 103a.

An operation procedure of the portable telephone 103 will now be described with reference to a flow chart shown in FIG. 7. In FIG. 7, steps denoted by the same symbols as those in FIG. 3 according to the first embodiment are like those in the first embodiment, and description of them will be omitted here. In the initialization processing at the time of start (step S31), the portable telephone 103 brings the MICs 15a and 15b into the OFF mode and sets the MIC 15c to the MIC operation mode (step S32).

When talking is started (step S3a), the CPU 24 checks the opening and closing state of the casing of the portable telephone 103 by using the opening and closing detecting unit 31. If as a result the casing is in the opened state, i.e., the casing is in the state shown in FIG. 6A (no at step S33), the CPU 24 notifies the acoustic processing unit 50 to that effect. The acoustic processing unit 50 sets the MICs 15a and 15b, which become unnecessary for talking in the state shown in FIG. 6A, and the SPK 11 to the OFF mode. In addition, the acoustic processing unit 50 sets the MIC 15c serving as transmitting means at the time of talking in the illustrated state to the MIC operation mode (step S34).

If at the time of talking the casing is in the folded state, i.e., the casing is in the state shown in FIG. 6B (yes at step S33), the acoustic processing unit 50 makes the MICs 15a and 15b disposed on the surface of the casing upper part 103a operate in the MIC operation mode as transmitting means and makes the SPK 11 operate in a receiver operation mode as receiving means in order to make talking possible in the illustrated state. And the acoustic processing unit 50 sets the MIC 15c, which cannot be used in the illustrated state, to the OFF mode (step S35).

If the portable telephone 103 is in the folded state as shown in FIG. 6B (yes at step S36) when the video phone is started (step S3b), the MICs 15a and 15b are made to operate in the MIC operation mode and the SPK 11 is made to operate in the monaural (left+right) speaker operation mode, whereas the MIC 15c is set to the OFF mode. If the casing of the portable telephone 103 is in the open state when it is used as video phone (no at the step S36), the MICs 15a and 15b are set to the OFF mode and the MIC 15c is made to operate in the MIC operation mode whereas the SPK 11 is made to operate in the monaural (left+right) speaker operation mode.

According to the portable telephone 103, therefore, it is possible to provide an acoustic input-output function suitable for ordinary talking or talking using the video phone according to the opening and closing state of the casing.

At the time of each of moving image recording (step S3c), moving image reproduction (step S3d) and voice and music reproduction (step S3e), the MIC 15c is set to the OFF mode and setting similar to the steps S6 and S7 in the first embodiment shown in FIG. 3 is conducted (steps S39 and S40).

Fourth Embodiment

FIG. 8 is a block diagram showing a configuration of a portable telephone 104 in a fourth embodiment. The acoustic input-output unit 10 in the portable telephone 104 includes the SPK 11, REC 13a and REC 13b as the acoustic output means. The acoustic input-output unit 10 further includes a signal source switch 18a and a signal source switch 18b for switching and setting the above-described receiver operation mode or speaker operation mode in the RECs 13a and 13b.

For example, when the REC 13a operates in the receiver operation mode, the signal source switch 18a connects the REC 13a to the REC drive unit 14. When the REC 13a is set to the speaker operation mode in predetermined communication processing described later, the signal source switch 18a connects the REC 13a to the SPK drive unit 12.

FIG. 9 schematically shows an exterior view of the portable telephone 104. The portable telephone 104 is a portable telephone of rotary type having a casing upper part 104a and a casing lower part 104b coupled by a pivot mechanism 104c. As shown in FIG. 9, the REC 13a and REC 13b are disposed near an LCD 27 on the casing upper part 104a, and an MIC 15 is disposed near the keys 25 on the casing lower part 104b. The SPK 11 is disposed on a tip face of the casing lower part 104b.

Figure 10:
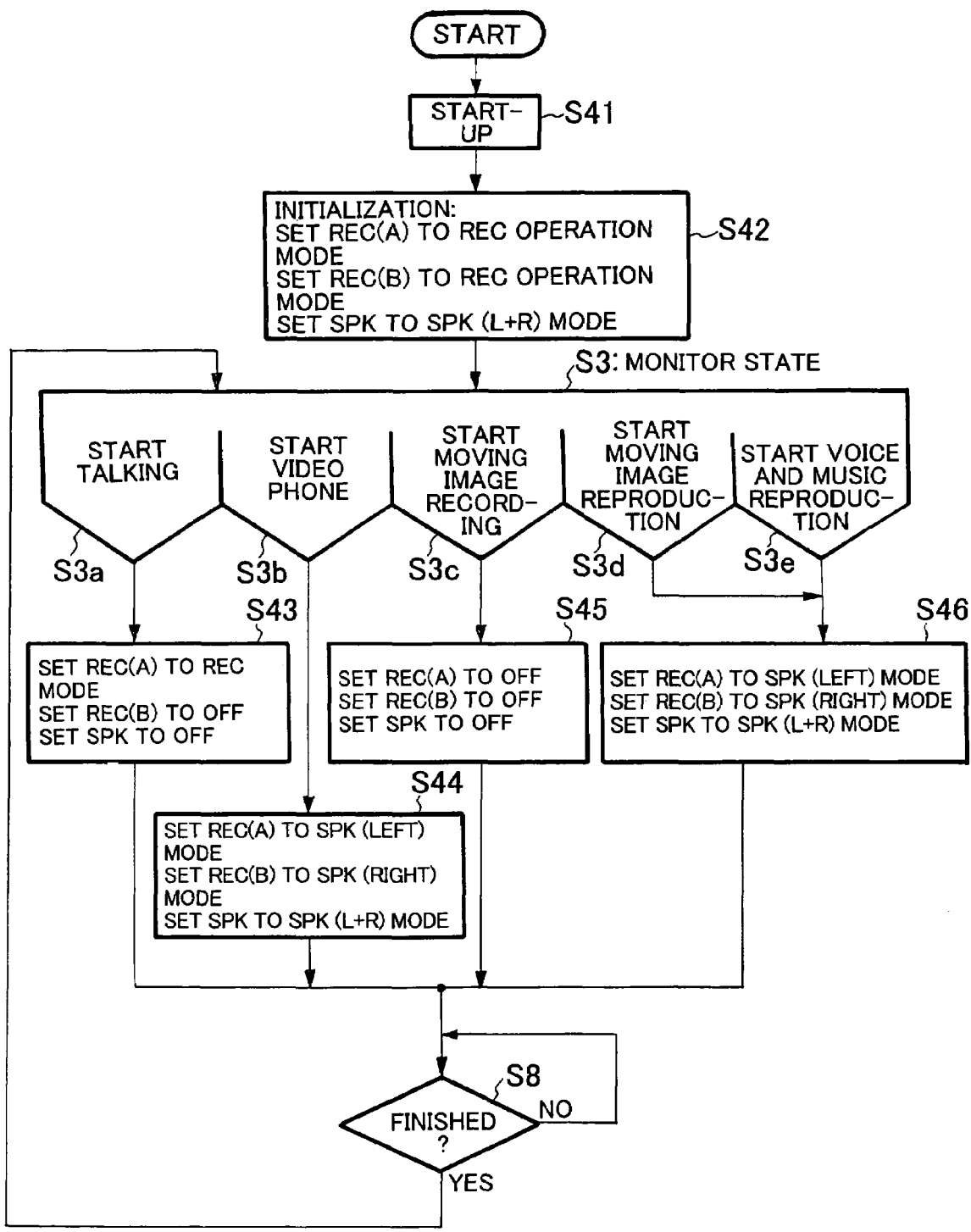
FIG. 10 is a flow chart showing an operation procedure in a fourth embodiment.

An operation procedure of the portable telephone 104 will now be described with reference to a flow chart shown in FIG. 10. As the initialization processing at the time of start (step s41), the portable telephone 104 sets the REC 13a and REC 13b to the receiver operation mode, and sets the SPK 11 to the monaural (left+right) speaker operation mode (step S42).

At the time of ordinary talking on the portable telephone 104 (step S3a), the user uses it while keeping it in contact with an ear, and consequently one of the REC 13a and REC 13b is made to operate in the receiver operation mode and the other of the receivers and the SPK 11 are turned off (step S43). In the illustrated example, the REC 13a is made to operate and the REC 13b is turned off.

At the time of talking using video phone (step S3b), the REC 13a is made to operate in the stereo (left) speaker operation mode and the REC 13b is made to operate in the stereo (right) speaker operation mode, whereas the SPK 11 is made to operate in the monaural (left+right) speaker operation mode (step S44). As a result, it is possible to provide voice with the feeling of presence by using three acoustic output means at the time of video phone operation.

At the time of moving image recording (step S3c), the acoustic external output becomes unnecessary, and consequently all of the REC 13a, REC 13b and SPK 11 serving as the acoustic output means are set to the OFF mode (step S45). At the time of moving image reproduction (step S3d) and at the time of voice and music reproduction (step S3e), stereo acoustic outputting using the REC 13a and 13b and monaural outputting using the SPK 11 are conducted in the same way as the step S44 at the time of video phone (step S46).

In the description of the fourth embodiment, the terminal of the rotary type as shown in FIG. 9 is used as the portable telephone 104. However, the above-described procedure can be applied to a terminal of folded type if it has the configuration shown in FIG. 8.

Fifth Embodiment

In the present invention, the acoustic output of the terminal of the rotary type such as the portable telephone 104 at the time of talking and at the time of video phone use can be controlled according to the opening and closing state of the casing. Hereafter, its technique will be described as a fifth embodiment.

FIG. 11 schematically shows an exterior view of a portable telephone 105 in the fifth embodiment. In the portable telephone 105 which is a terminal of rotary type, a REC 13a is disposed near a tip of the casing upper part 105a as shown in FIG. 11A. A REC 13b is disposed near a pivot mechanism 105c and across an LCD 27 from the REC 13a. By the way, the SPK 11 serving as another acoustic output means is disposed in the same way as the portable telephone 104 shown in FIG. 9.

A state in which the portable telephone 105 is closed, i.e., the casing upper part 105a is rotated by the pivot mechanism 105c and laid on top of the casing lower part 105b is shown in FIG. 11B. As appreciated from FIG. 11B, the portable telephone 105 is formed so as to expose a MIC 15 on the casing lower part 105b even when the casing is closed. In both the state in which the portable telephone 105 is open as shown in FIG. 11A and the state in which the portable telephone 105 is closed as shown in FIG. 11B, therefore, the MIC 15 can be used as the acoustic input means.

The portable telephone 105 detects the opening and closing state of the casing by using the opening and closing detecting unit 31 shown in FIG. 8. As the opening and closing detecting unit 31, for example, the pressure sensor described with reference to the third embodiment is used, and it is disposed near the tip on the surface of the casing upper part 105a, i.e., near the tip on a face facing the face of the LCD 27 in opposite directions. As a result, the state of the FIG. 11B can be detected as the closed state of the casing.

An operation procedure of the portable telephone 105 will now be described with reference to a flow chart shown in FIG. 12. By the way, a procedure at the time of moving image recording (step S3c), at the time of moving image reproduction (step S3d), and at the time of voice and music reproduction (step S3e) is the same as that in the fourth embodiment described with reference to FIG. 10, and its description will be omitted.

In initialization processing at the time of start (step S51), the portable telephone 105 turns off the REC 13a and REC 13b and sets the SPK 11 to the monaural (left+right) speaker operation mode (step S52).

At the time of ordinary talking (step S3a), the CPU 24 checks the opening and closing state of the casing by using the opening and closing detecting unit 31, and notifies the acoustic processing unit of its result. Specifically, if the casing is in the rotated and housed state as shown in FIG. 11B, i.e., in the closed state (yes at step S53), the REC 13b disposed near the pivot mechanism 105c is made to operate in the receiver operation mode in order to use it as transmitting means, and the REC 13a and SPK 11 are turned off (step S54).

If the casing is in the opened state as shown in FIG. 11A (no at step S53), the REC 13a is made to operate in the receiver operation mode in order to use it as transmitting means, and the REC 13b and SPK 11 are turned off (step S55).

At the time of talking using video phone (step S3b), the REC 13a, REC 13b and SPK 11 are made to operate respectively in the stereo (left) speaker operation mode, the stereo (right) speaker operation mode and the monaural (left+right) speaker operation mode, in the state in which the casing is open (yes at step S56) or in the state in which the casing is closed (no at the step S56). By the way, the (left) and (right) of the stereo outputs of the REC 13a and REC 13b may be interchanged according to the opening and closing state of the casing.

What is claimed is:

1. A portable communication terminal comprising:
   an acoustic input-output unit comprising a plurality of dynamic acoustic input means and input-output switching means to conduct acoustic inputting and outputting, and a plurality of acoustic output means to conduct acoustic outputting;
   a communication processing unit which selectively executes mutually different communication processes using at least one of the plurality of dynamic acoustic input means and input-output switching means, and the plurality of acoustic output means included in the acoustic input-output unit; and
   an acoustic processing unit which determines an order of operation of the acoustic input-output unit to be conducted by the plurality of dynamic acoustic input means and input-output switching means, and the plurality of acoustic output means according to a communication process executed by the communication processing unit, and gives the determined operation order to the acoustic input-output unit.

2. The portable communication terminal according to claim 1, wherein the acoustic input-output unit comprises a plurality of input-output switching means which selectively executes acoustic inputting and acoustic outputting by using the plurality of dynamic acoustic input means, and the acoustic processing unit orders the acoustic input-output unit to conduct the acoustic outputting by using the plurality of dynamic acoustic input means.

3. The portable communication terminal according to claim 2, wherein in the operation order given to the acoustic input-output unit the acoustic processing unit sets operation parameters for stereo acoustic outputting conducted by the plurality of dynamic acoustic input means and input-output switching means.

4. The portable communication terminal according to claim 1, wherein in the operation order given to the acoustic input-output unit the acoustic processing unit gives operation parameters for stereo acoustic inputting conducted by the plurality of dynamic acoustic input means and input-output switching means.

5. The portable communication terminal according to claim 1, wherein the acoustic processing unit compares acoustic input levels input by the respective dynamic acoustic input means and input-output switching means, and orders the acoustic input-output unit to stop acoustic inputting conducted by dynamic acoustic input means and input-output switching means having a lowest input level.

6. The portable communication terminal according to claim 1, wherein the communication processing unit comprises an open and closing detecting means which detects an opening and closing state of a terminal casing, and the acoustic processing unit determines an operation order to be given to the acoustic input-output unit based on the opening and closing state detected by the communication processing unit.

7. The portable communication terminal according to claim 6, wherein the portable communication terminal is a portable telephone of folding type in which two casing parts are opened and closed by a hinge mechanism.

8. The portable communication terminal according to claim 1, wherein the plurality of dynamic acoustic input means comprises a plurality of dynamic microphones.

9. The portable communication terminal according to claim 1, wherein the acoustic output means is a speaker, a speaker drive unit, a REC unit and a REC drive unit.

10. A portable communication terminal comprising:
an acoustic input-output unit comprising dynamic acoustic input means and input-output switching means to conduct acoustic inputting and outputting, and a plurality of acoustic output means to conduct acoustic outputting;
a communication processing unit which selectively executes mutually different communication processes using at least one of the plurality of dynamic acoustic input means and input-output switching means, and the plurality of acoustic output means included in the acoustic input-output unit; and
an acoustic processing unit which determines an order of operation of the acoustic input-output unit to be conducted by the plurality of dynamic acoustic input means and input-output switching means, and the plurality of acoustic output means according to a communication process executed by the communication processing unit, and gives the determined operation order to the acoustic input-output unit.

11. The portable communication terminal according to claim 10, wherein in the operation order given to the acoustic input-output unit the acoustic processing unit sets operation parameters for stereo acoustic outputting conducted by the plurality of acoustic output means.

12. The portable communication terminal according to claim 10, wherein in the operation order given to the acoustic input-output unit the acoustic processing unit sets operation parameters which differ from communication process to communication process, as regards output levels of the acoustic outputting conducted by the plurality of acoustic output means.

13. The portable communication terminal according to claim 10, wherein the communication processing unit comprises an open and closing detecting which detects an opening and closing state of a terminal casing, and the acoustic processing unit determines an operation order to be given to the acoustic input-output unit based on the opening and closing state detected by the communication processing unit.

14. The portable communication terminal according to claim 13, wherein the portable communication terminal is a portable telephone of rotary type in which two casing parts are opened and closed by a pivot mechanism.

15. The portable communication terminal according to claim 10, wherein the dynamic acoustic input means comprises a plurality of dynamic microphones.

16. The portable communication terminal according to claim 10, wherein the acoustic output means is a speaker, a speaker drive unit, a REC unit and a REC drive unit.

17. A portable communication terminal comprising:
an acoustic input-output unit comprising a plurality of dynamic microphones and input-output switches to conduct acoustic inputting and outputting, and a speaker, a speaker drive unit, a REC unit and a REC drive unit to conduct acoustic outputting;
a communication processing unit which selectively executes mutually different communication processes using at least one of the plurality of the dynamic microphones and input-output switches and speaker and a speaker drive unit and a REC unit and a REC drive unit included in the acoustic input-output unit; and
an acoustic processing unit which determines an order of operation of the acoustic input-output unit to be conducted by the plurality of dynamic microphones and input-output switches and speaker and a speaker drive unit and a REC unit and a REC drive unit according to a communication process executed by the communication processing unit, and gives the determined operation order to the acoustic input-output unit.

18. The portable communication terminal according to claim 17, wherein a microphone is connected to an input/output switch.

19. The portable communication terminal according to claim 18, wherein the speaker is connected to a speaker drive unit, and the speaker drive unit communicates with each input/output switch.

20. The portable communication terminal according to claim 19, wherein the acoustic input-output unit further comprises a microphone input detecting unit which communicates with each input/output switch, and the speaker drive unit and the microphone input detecting unit communicate with the acoustic processing unit.

* * * * *